(12) United States Patent
Robinson

(10) Patent No.: US 8,339,662 B2
(45) Date of Patent: Dec. 25, 2012

(54) HLC IMAGES FROM A COLOR SCANNING SYSTEM

(75) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 758 days.

(21) Appl. No.: 11/862,480

(22) Filed: Sep. 27, 2007

(65) Prior Publication Data

US 2009/0086274 A1 Apr. 2, 2009

(51) Int. Cl.
*H04N 1/60* (2006.01)

(52) U.S. Cl. ......... 358/1.9; 358/2.1; 358/3.06; 358/517; 358/518; 358/521

(58) Field of Classification Search .................. 358/1.9, 358/518–522
See application file for complete search history.

(56) References Cited

U.S. PATENT DOCUMENTS

| | | | |
|---|---|---|---|
| 4,078,929 A | | 3/1978 | Gundlach |
| 5,237,517 A | * | 8/1993 | Harrington et al. ........... 382/162 |
| 5,287,204 A | * | 2/1994 | Koizumi et al. .............. 358/538 |
| 5,291,243 A | * | 3/1994 | Heckman et al. .................. 399/3 |
| 5,668,636 A | * | 9/1997 | Beach et al. .................. 358/296 |
| 6,115,493 A | | 9/2000 | Harrington |
| 6,341,020 B1 | * | 1/2002 | Rumph et al. ................. 358/1.9 |
| 6,426,802 B1 | * | 7/2002 | Lin ................................ 358/1.9 |
| 6,721,069 B1 | | 4/2004 | Harrington |
| 6,995,866 B2 | * | 2/2006 | Feng et al. .................... 358/1.9 |
| 7,190,489 B2 | * | 3/2007 | Weiner ......................... 358/3.06 |
| 2005/0050465 A1 | * | 3/2005 | Horton et al. ................. 715/526 |
| 2006/0268287 A1 | | 11/2006 | Robinson |

* cited by examiner

Primary Examiner — Richard Zhu
(74) Attorney, Agent, or Firm — Fay Sharpe LLP

(57) ABSTRACT

Systems and methods are described that facilitate generating a ready-to-print binary dual-plane HLC image for output to an HLC device. A print-ready highlight color (HLC) image can be generated without digital front end (DFE) processing. For example, according to one or more aspects, a color scanner can be employed to produce a two-plane binary TIFF image. One plane contains black (e.g., achromatic) content, while the other contains highlight color content. Black pixels are identified and/or determined using neutral pixel and neutral window detection. Background pixels are mapped to white for both planes. Pixels that are non-neutral and non-background are designated as color pixels. After separation into a neutral plane and an HLC plane, the planes are processed into binary data for printing.

17 Claims, 3 Drawing Sheets

HLC IMAGES FROM A COLOR SCANNING SYSTEM

BACKGROUND

The subject application relates to color scanning, and more particularly to highlight (HLC) color scanning to generate a ready-to-print dual-layer HLC image without having to process the image at a digital front end of a printing device.

A process referred to as "highlight color imaging" has been accomplished by employing basic xerographic techniques. The concept of tri-level, highlight color xerography is described in U.S. Pat. No. 4,078,929. That patent discloses the use of tri-level xerography as a means to achieve single-pass highlight color imaging. As disclosed therein, a charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. In another embodiment, the toner particles are presented to the charge pattern using a pair of magnetic brushes, each brush supplying a toner of one color and one charge. In yet another embodiment, the development systems are biased to approximately the background voltage. Such biasing results in a developed image of improved color sharpness.

By proper relation of operational control voltages and toner types, a highlight color printing machine can operate in one of three operational modes, namely "highlight color", "monochrome-color" or "monochrome-black". Additionally, the toner or marking material used to generate the highlight can assume one of a wide variety of colors. A print job is executed on the highlight color printing machine by providing a program indicating selections for color printing mode and marking material color. Moreover, many HLC commercial printing operations are characterized as "lights-out" facilities because many large print jobs are processed essentially continuously with little or no human intervention. Bulk printing machines are typically connected to a central job dispatcher through an electronic network. In those type applications, a fault condition causing a color printing delay which may arise due to failure of a xerographic sub-system, an inadequate supply of color toner, an improper color, or other reasons, can result in significant delays and potentially massive commercial losses.

With regard to scanners, if a customer desires a highlight color (HLC) print from a color scan, the color scan is delivered to the digital front end (DFE), which uses one of several algorithms to determine if the color scan pixels should be printed as a HLC or a black pixel. One problem is the regions that the customer believes should be rendered as pure black or pure HLC are instead "contaminated" with an undesirable color. The DFE color-to-HLC algorithms do not have the classification sophistication of the image processing available on modern production scanners to enable better HLC vs. black-and-white discrimination. Conventional processes for converting 24-bit color scans to two plane binary HLC print ready images on the DFE also limit productivity.

Many scan-to-HLC print applications are dependent on the color portion of the scanned page being rendered as pure HLC, and the black-and-white portion of the page being rendered as pure black-and-white. For example, black text being rendered with HLC mixed in is considered an image quality defect. Likewise, color markups rendered with black mixed in are also considered a defect. Color print jobs also are productivity limitation on DFEs of HLC print systems.

Accordingly, there is an unmet need for systems and/or methods that facilitate overcoming the aforementioned deficiencies.

BRIEF DESCRIPTION

In accordance with various aspects described herein, systems and methods are described that facilitate generating a ready-to-print binary dual-plane image for export to and printing by a printer without requiring image processing at a digital front-end of the printer. For example, a method for improving image quality and throughput in a highlight color (HLC) print platform comprises receiving red, blue, and green (RGB) image data related to a document image, segregating the image data to generate a neutral plane and an HLC plane, applying a black-and-white binary image processing protocol to the neutral plane and the HLC plane to generate a binary neutral plane and a binary HLC plane, and generating an image file from the binary neutral plane and a binary HLC plane. The method further comprises appending identifier information to each of the neutral plane and the HLC planes to distinguish the planes from each other. Additionally or alternatively, the method comprises at least one of converting the RGB image data into CIELAB image data or CMY image data or CMYK image data, prior to segregating the image data, or retaining the image data as RGB image data. According to other features, the method comprises identifying neutral pixels in the image data by determining whether chromatic content is present in the color values of the pixels. A reprographic neutral pixel detection technique can be employed to detect the presence of chromatic content. Additionally or alternatively, background pixels can be identified in the image data as pixels with color values approximately equal to a pure white color value, and one or more neutral windows comprising multiple adjacent neutral pixels in the image data can be identified. A reprographic neutral pixel window detection technique can then be applied to detect the presence of chromatic content, and pixels that have not been identified as either background pixels or as neutral pixels can be identified as color pixels.

According to other features, generating the neutral plane comprises generating a plane of achromatic data comprising the achromatic values of the identified neutral pixels, assigning an approximately pure white value to identified color and background pixels, and processing a resultant achromatic channel plane using a black-and-white binary image processing technique to generate the neutral plane having binary pixels. Generating the HLC plane comprises generating a plane of chromatic data comprising the chromatic values of the identified color pixels, assigning an neutral chromatic value to identified neutral and background pixels, and processing a resultant chromatic channel plane using a black-and-white binary image processing technique to generate the HLC plane having binary pixels.

According to another aspect, a system that facilitates generating a ready-to-print binary highlight color (HLC) image file comprises a scanner that scans a document using an RGB scan bar, a pixel analyzer that evaluates the image data to identify achromatic and color values for pixels described by the image data, a plane generator that executes a black-and-white binary image processing technique to generate a binary neutral plane and a binary HLC plane, and a processor that generates an image file by combining the binary neutral plane and the binary HLC plane, adds identifier information to each plane, and outputs the image file to an HLC device for printing. The pixel analyzer identifies neutral pixels in the image data by determining whether chromatic content is present in the color values of the pixels, and identifies background pixels in the image data as pixels with achromatic values approximately equal to a pure white value. Additionally, the pixel analyzer identifies one or more neutral windows comprising multiple adjacent neutral pixels in the image data, and identifies color pixels as any pixels that have not been identified as either background pixels or as neutral pixels.

The plane generator generates the neutral plane by generating a plane of achromatic data comprising the achromatic values of the identified neutral pixels, assigning a achromatic value approximately equal to a pure white value to identified color and background pixels, and processing a resultant achromatic channel plane using the black-and-white binary image processing technique to generate the neutral plane having binary pixels. The plane generator generates the HLC plane by generating a plane of chromatic data comprising the chromatic values of the identified color pixels, assigning a chromatic value of a neutral chromatic value to identified neutral and background pixels, and processing a resultant chromatic channel plane using the black-and-white binary image processing technique to generate the HLC plane having binary pixels. The processor converts the RGB image data into at least one of CIELAB image data or CMY image data prior to evaluation of the image data by the pixel analyzer.

According to yet another aspect, a scanning platform comprises one or more xerographic components that execute instructions for performing a xerographic process, a processor that converts RGB data related to an electronic document image into CIELAB image data, a pixel analyzer that evaluates the CIELAB image data to identify L*, a*, and b* values for pixels described by the CIELAB image data, and a plane generator that executes a black-and-white binary image processing technique to generate a binary neutral plane and a binary HLC plane. The processor generates an image file by combining the binary neutral plane and a binary HLC plane, adds identifier information to each plane, and outputs the image file to an HLC device for printing.

DETAILED DESCRIPTION

In accordance with various features described herein, systems and methods are described that facilitate generating a print-ready highlight color (HLC) image without digital front end (DFE) processing. For example, according to one or more aspects, a color scanner can be employed to produce a two-plane binary TIFF image. One plane contains black (or achromatic) content, while the other contains highlight color content. Black pixels are identified and/or determined using neutral pixel and neutral window detection. Background pixels are mapped to white for both planes. The leftover (non-neutral or background) pixels are designated as color pixels. After the separation into two planes, the color data is processed into binary data for printing. The resultant binary two plane TIFF is print ready for HLC devices (e.g., such as Sorrento or Torino, by Xerox).

According to other features, image quality and throughput is improved for HLC printing and scanning when an input file comprises RGB raster image data, an original hard copy that is scanned using an RGB scanner bar, etc. For instance, a scanner can produce RGB raster data upon scanning a hard-copy, and can generate a dual-plane binary TIFF image. A first plane comprises achromatic (or "gray") content, and a second plane comprises HLC content. Black pixels can be identified using neutral pixel detection and/or neutral window (e.g., autowindowing or the like) detection protocols. Background pixels can be mapped to white for both planes, and remaining pixels (e.g., non-neutral, non-background pixels) are identified as color pixels. After the two planes of data are separated out from each other, the color data is processing into binary data for printing. The resulting binary dual-plane TIFF image is ready to print by an HLC printing device or the like.

Figure 1:
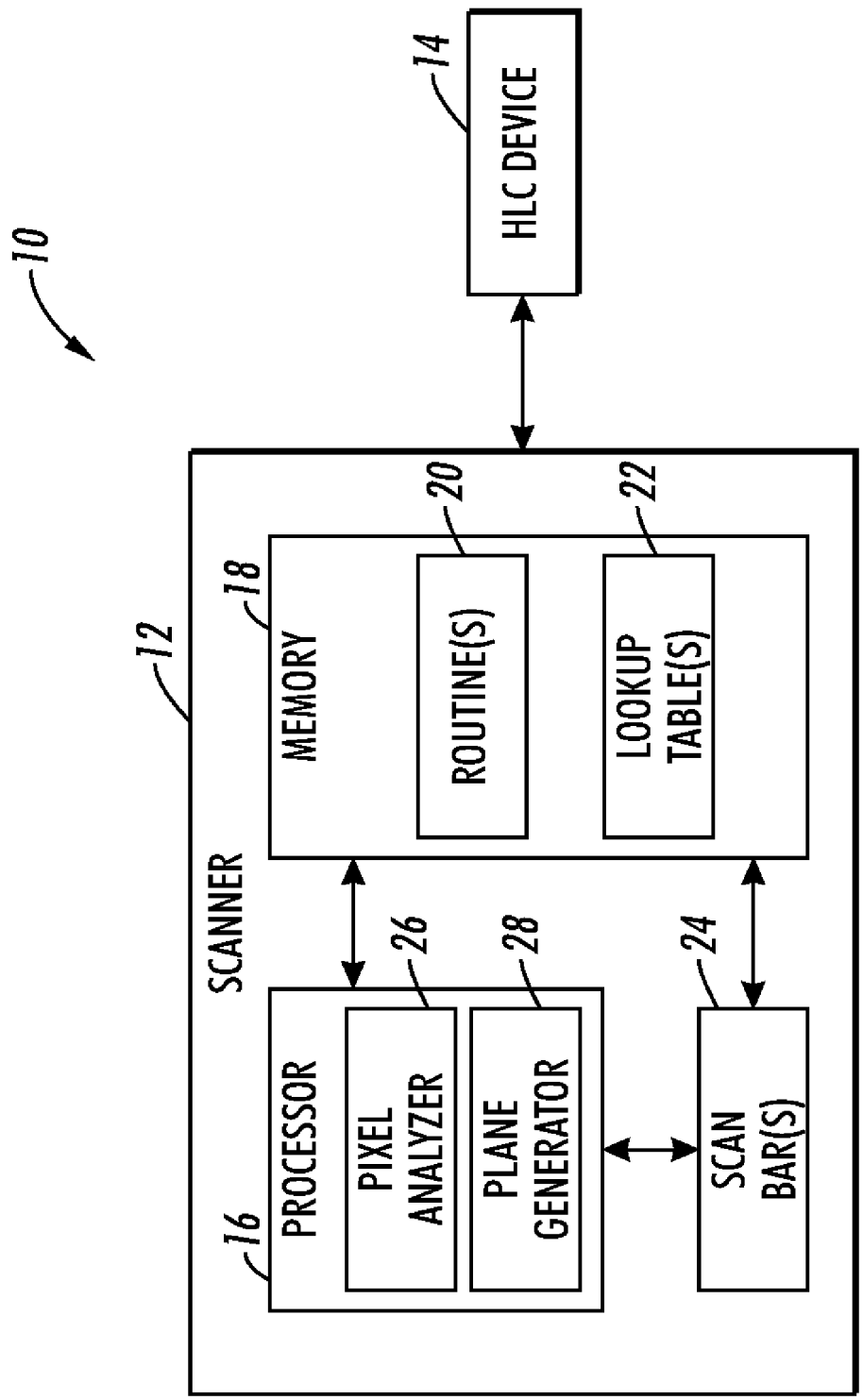
FIG. 1 illustrates a system that facilitates generating a print-ready HLC image for an HLC device, in accordance with one or more aspects.

With reference to FIG. 1, a system 10 is illustrated that facilitates generating the print-ready HLC image for an HLC device, in accordance with one or more aspects. The system 10 includes a scanner 12 coupled to an HLC device 14. The scanner 12 includes a processor 16 that is coupled to a memory 18, which in turn comprises one or more machine-readable and/or executable routines 20 that may be executed by the processor. The memory 18 additionally stores one or more look-up tables 22 comprising pixel information, color information, scanner information, scan bar information, or any other suitable information for carrying out the various functions and/or conversions described herein. Both the processor 16 and the memory 18 are communicatively coupled to one or more color scan bars 24, which are employed to scan a document page or image.

A color scan (e.g., of a document or the like) is captured using the color scan bar 24. In one example, the scan bar 24 is similar or identical to a Xerox 665 production scanner's scan bar. For instance, the scan bar 24 can comprise three individual bars, one for each of red, green, and blue scan data. The red, green, and blue (RGB) data (e.g., 8 bits per color channel) is brought into the scanner image processing, as performed by the processor 16. In one example, the processor 16 converts the RGB data of the color scan into CIELAB color space, to enable discrimination between color and neutral pixels. The CIELAB color scan data is then processed to segregate the image into two images. One image represents the gray portion (e.g., non-chromatic or achromatic) of the scan image, while the other image represents the color or chromatic content of the image. In another example, the RGB data is converted into CMYK image data, and pixels evaluated for color and gray values. In still another example, the RGB data is not converted, and is pixels are evaluated to determine their respective color and gray values.

Color/neutral image segregation is accomplished by executing a number of actions in the processor 16, which are stored as routines 20 in the memory 18. For instance, the processor 16 can include a pixel analyzer 26 that executes one or more routines for classifying pixels according to their achromatic and/or color content. The pixel analyzer 26 classifies the neutral pixels within the image. In one example, a reprographic neutral pixel detection protocol or routine, stored in memory 18, is executed to accomplish neutral pixel classification. The pixel analyzer analyzes the pixels to determine if chromatic content is present in a pixel's color values (e.g., "significant" chromatic a*, b* values, if the data has been converted into CIELAB space, etc.)

To further this example, the pixel analyzer 26 can additionally classify the background pixels, which may be generally white or close to white pixels. According to an example, the CIELAB values of such pixels are approximately $L^* \sim 100$, $a^* \sim 0$, $b^* \sim 0$, etc. It will be appreciated, however, that the CIELAB values carried by the scanner may differ: for instance, an $L^*$ scanner value of 255 may be equal to CIELAB $L^*=100$).

The pixel analyzer 26 furthermore classifies neutral windows in the scanned image data. According to an example, a reprographic neutral pixel window protocol or routine is stored in the memory 18 and executed by the pixel analyzer to accomplish neutral window detection and/or classification, for instance by analyzing document regions that are composed of mainly neutral pixels and determining whether the entire region's pixels should be classified as neutral pixels. Once neutral and background pixels have been identified, the pixel analyzer 26 classifies remaining pixels (e.g., those pixels not determined to be neutral or background pixels) as color pixels.

The processor 16 further includes a plane generator 28 that builds an achromatic or neutral plane and a color plane to facilitate generating the two-plane binary image. For instance, when using RGB image data that has been converted to CIELAB image space for the neutral or achromatic image, the plane generator 28 builds a plane of achromatic data composed of the $L^*$ values of the "neutral" pixels. Pixels classified as background or color pixels are be given $L^*$ values of "white" (e.g. CIELAB $L^*=100$ in one example). The resultant $L^*$ channel plane is processed, by the processor 16 in conjunction with the plane generator 28, using a black-and-white binary image processing routine. In one example, the scanner is a Xerox 665 production scanner with a black-and-white binary imaging processing routine resident thereon. The resultant "B/W" image plane is composed of binary pixels.

For the color image, one plane of achromatic data composed of the $L^*$ values of the "color" pixels is built by the plane generator 28. Pixels classified as background or neutral pixels are given $L^*$ values of "white," e.g. CIELAB $L^*=100$. The processor 16, in conjunction with the plane generator 28, process the resultant $L^*$ channel plane using the B/W binary image processing routine, and the resultant "HLC" image plane is composed of binary pixels. The processor 16 then creates a TIFF file composed of the two planes of binary image data. The processor additionally tags or otherwise identifies the image planes to reveal which is the B/W plane and which is the HLC plane. In one example, the file format can be a reuse of a DocuSP decomposition TIFF file format for HLC printers. Since the scan has been converted to a "print ready" image, the need for DFE processing to convert the color scan to HLC print planes is eliminated. Further, dependence, use, selection etc. of color-to-HLC algorithms on the DFE is eliminated. In this manner, image quality for reprographic HLC applications is improved by generating purely black-and-white and purely HLC regions in a document image, which in turn facilitates improving throughput and reducing cost.

It will be appreciated that the foregoing examples are illustrative in nature, and that the various features described herein are not limited to, for example, a TIFF file format, but rather can employ any suitable file format. Moreover, the features described herein can be employed to map color pixels with values of a particular hue to the HLC plane, while all other non-white pixels are mapped to a black plane. Still furthermore, while conversion of RGB image data to CIELAB space facilitates identifying achromatic and color values for pixels, the RGB data itself may be employed to determine grayscale and/or color values and/or may be converted into CMYK data for evaluation of pixel color and achromatic values.

According to other features, one or more xerographic components (e.g., printing, scanning, photocopying components, etc.) are employed in conjunction with the various components of system 10. It is to be understood that the systems and methods described herein can be employed with any suitable scanning platform, printing platform, photocopying platform, etc., as well as combinations thereof.

Figure 2:
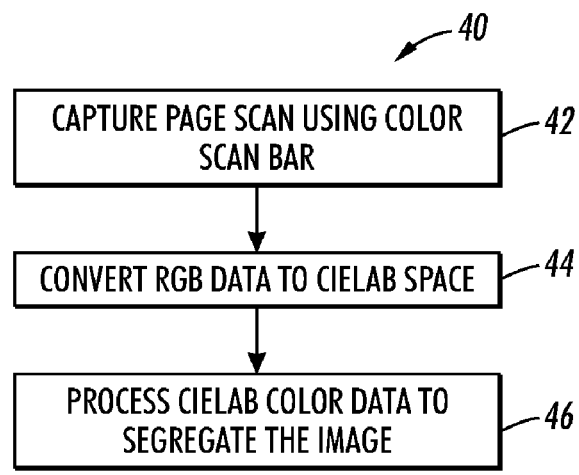
FIG. 2 is an illustration of a method for segregating a color scan of an image to generate a dual-plane binary pixel image that is ready to print without DFE processing, in accordance with one or more features described herein.
Figure 3:
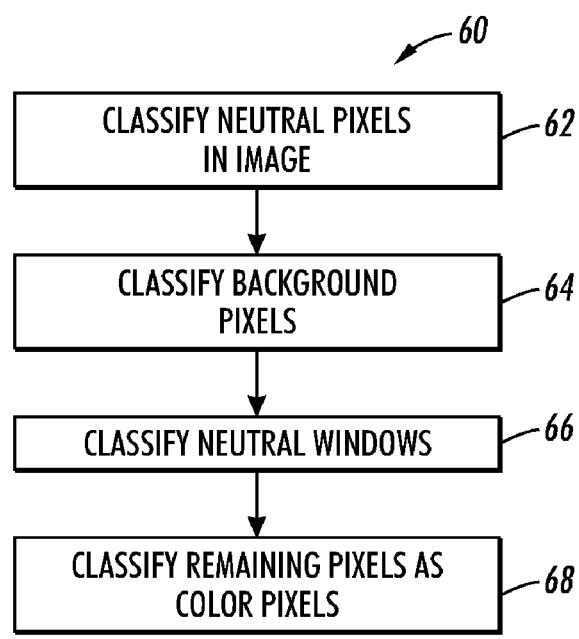
FIG. 3 is an illustration of a method for classifying the pixels in a scanned image, in accordance with various aspects presented herein.
Figure 4:
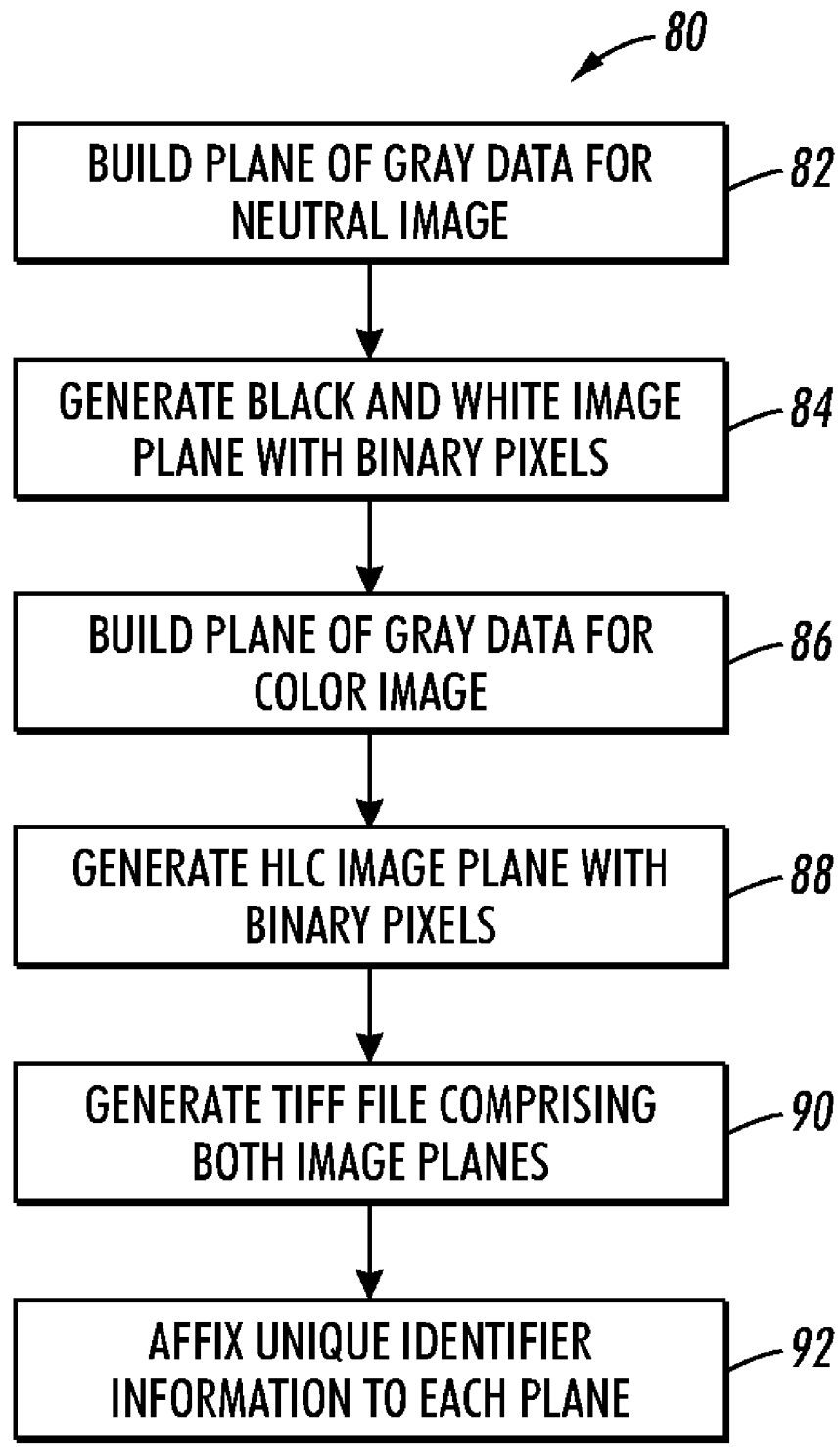
FIG. 4 is an illustration of a method of building a dual-plane, ready-to-print image file, which may be forwarded to an HLC device without DFE processing.

FIGS. 2-4 illustrate one or more methods related to mitigating a need for color-to-HLC conversion at a DFE in a color scanner/printer system, in accordance with various features. While the methods are described as a series of acts, it will be understood that not all acts may be required to achieve the described goals and/or outcomes, and that some acts may, in accordance with certain aspects, be performed in an order different that the specific orders described.

FIG. 2 is an illustration of a method 40 for segregating a color scan of an image to generate a dual-plane binary pixel image that is ready to print without DFE processing, in accordance with one or more features described herein. At 42, a document page is captured using a color scan bar. According to an example, the color scan bar includes separate bars for each primary color of light (e.g., red, green, and blue). For instance, the RGB data can comprise multiple bits per color channel (e.g., 8, 16, 24, etc.). At 44, the RGB data is optionally converted to CIELAB space to facilitate sorting color (e.g., non-monochrome) and neutral (e.g., monochrome) pixels. The color data is then processed to segregate the image into HLC and black-and-white data, at 46. That is, one image can represent a gray/achromatic portion of the scanned image, while a second image represents the color or chromatic content of the scanned image. The segregated images can then be processed as described below.

FIG. 3 is an illustration of a method 60 for classifying the pixels in a scanned image, in accordance with various aspects presented herein. At 62, neutral pixels in the scanned image are classified. For instance, a reprographic neutral pixel detection routine or protocol is executed to analyze pixels and to determine whether chromatic content is present in a given pixel's color values (e.g., "significant" chromatic a* and b* values). At 64, background pixels (e.g., generally white or "close to white" pixels, such as pixels having values of $L^* \sim 100$, $a^* \sim 0$, $b^* \sim 0$) are classified. It will be appreciated that $L^*a^*b^*$ values carried by the scanner may differ from standard CIELAB values (e.g., an $L^*$ scanner value of 255, or some other number, may be equal to a CIELAB $L^*$ value of 100). Moreover, in accordance with other examples, color and achromatic values are determined without converting the RGB data to CIELAB space. At 66, neutral windows are classified or identified. In one example, a reprographic neutral pixel window routine or protocol is executed to analyze image regions that are composed mainly of neutral pixels, and determines whether the all pixels in the region should be classified as neutral pixels. At 68, all pixels not identified as neutral or background pixels are classified as color pixels.

FIG. 4 is an illustration of a method 80 of building a dual-plane, ready-to-print image file, which may be forwarded to an HLC device without DFE processing. At 82, a plane of achromatic data is generated for a neutral image, and comprises the achromatic or $L^*$ values of the "neutral" pixels (e.g., as classified or identified in the method 60). Pixels classified as background or color pixels are given achromatic or L* values of "white" (e.g. CIELAB L* values of 100, etc.). The resultant achromatic channel plane is processed using black-and-white binary image processing, and the resultant black-and-white image plane is generated at 84 and is composed of binary pixels. At 86, for the color image, a plane of chromatic data comprising the chromatic or ($C^*=\sqrt{(a^{*2}+b^{*2}}>0$) values of the "color" pixels is built. Pixels classified as background or neutral pixels are given chromatic or C* values of "white" (e.g. CIELAB C* values of 0). The resultant chromatic channel plane is processed using black-and-white binary image processing to generate an "HLC" image plane composed of binary pixels, at 88. A TIFF file comprising the two planes of binary image data is built, at 90. At 92, the image planes are tagged to distinguish the black-and-white plane from the HLC plane. According to an example, the file format can be a reuse of a DocuSP decomposition TIFF file format for HLC printers. In another example the image planes are tagged prior to combination at 90. In still another example, the HLC image plane is generated prior to the black-and-white image plane.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for improving image quality and throughput in a highlight color (HLC) print platform, comprising:
   scanning an input file using a color scan bar;
   receiving red, blue, and green (RGB) image data related to a scanned document image;
   segregating the image data to generate a neutral plane and an HLC plane;
   applying a black-and-white binary image processing protocol to the neutral plane and the HLC plane to generate a binary neutral plane and a binary HLC plane;
   generating a two-plane binary TIFF image file from the binary neutral plane and the binary HLC plane; and
   storing the TIFF image file in a memory for recall and printing;
   wherein generating the neutral plane comprises:
      generating a plane of achromatic data comprising the achromatic values of identified neutral pixels;
      assigning non-transparent, approximately pure white value to identified color and background pixels; and
      processing a resultant achromatic channel plane using a black-and-white binary image processing technique to generate the neutral plane having binary pixels; and
   wherein generating the HLC plane comprises:
      generating a plane of chromatic data comprising the chromatic values of identified color pixels;
      assigning a non-transparent, approximately pure white value to identified neutral and background pixels; and
      processing a resultant chromatic channel plane using a black-and-white binary image processing technique to generate the HLC plane having binary pixels.

2. The method of claim 1, further comprising appending identifier information to each of the neutral plane and the HLC planes to distinguish the planes from each other.

3. The method of claim 1, further comprising at least one of converting the RGB image data into CIELAB image data or CMY image data or CMYK image data, prior to segregating the image data, or retaining the image data as RGB image data.

4. The method of claim 3, further comprising identifying neutral pixels in the image data by determining whether chromatic content is present in the color values of the pixels.

5. The method of claim 4, further comprising employing a reprographic neutral pixel detection technique to detect the presence of chromatic content.

6. The method of claim 1, further comprising identifying one or more neutral windows comprising multiple adjacent neutral pixels in the image data.

7. The method of claim 6, further comprising employing a reprographic neutral pixel window detection technique to detect the presence of chromatic content.

8. The method of claim 7, further comprising identifying pixels that have been determined to be neither background pixels nor neutral pixels, as color pixels.

9. A system that facilitates generating a ready-to-print binary highlight color (HLC) image file, comprising:
   a scanner that scans a document using an RGB scan bar;
   a pixel analyzer that evaluates the image data to identify achromatic and color values for pixels described by the image data;
   a plane generator that assigns a non-transparent achromatic value approximately equal to a pure white value to identified color and background pixels and executes a black-and-white binary image processing technique to generate a binary neutral plane and a binary HLC plane; and
   wherein generating the neutral plane comprises:
      generating a plane of achromatic data comprising the achromatic values of identified neutral pixels;
      assigning non-transparent, approximately pure white value to identified color and background pixels; and
      processing a resultant achromatic channel plane using a black-and-white binary image processing technique to generate the neutral plane having binary pixels; and
   a processor that generates a two-plane binary TIFF image file by combining the binary neutral plane and the binary HLC plane, adds identifier information to each plane, and outputs the TIFF image file to an HLC device for printing.

10. The system of claim 9, wherein the pixel analyzer identifies neutral pixels in the image data by determining whether chromatic content is present in the color values of the pixels.

11. The system of claim 10, wherein the pixel analyzer identifies background pixels in the image data as pixels with achromatic values approximately equal to a pure white value.

12. The system of claim 11, wherein the pixel analyzer identifies one or more neutral windows comprising multiple adjacent neutral pixels in the image data.

13. The system of claim 12, wherein the pixel analyzer identifies color pixels as any pixels that have not been identified as either background pixels or as neutral pixels.

14. The system of claim 13, wherein the plane generator generates the neutral plane by:
   generating a plane of achromatic data comprising the achromatic values of the identified neutral pixels; and
   processing a resultant achromatic channel plane using the black-and-white binary image processing technique to generate the neutral plane having binary pixels.

15. The system of claim 14, wherein the plane generator generates the HLC plane by:
   generating a plane of chromatic data comprising the chromatic values of the identified color pixels;
   assigning a non-transparent, approximately pure white value to identified neutral and background pixels; and processing a resultant chromatic channel plane using the black-and-white binary image processing technique to generate the HLC plane having binary pixels.

16. The system of claim 9, wherein the processor converts the RGB image data into at least one of CIELAB image data or CMY image data prior to evaluation of the image data by the pixel analyzer.

17. A scanning platform, comprising:
one or more xerographic components that execute instructions for performing a xerographic process;
a processor that converts RGB data related to an electronic document image into CIELAB image data;
a pixel analyzer that evaluates the CIELAB image data to identify L*, a*, and b* values for pixels described by the CIELAB image data; and
a plane generator that assigns a non-transparent achromatic value approximately equal to a pure white value to identified color and background pixels and executes a black-and-white binary image processing technique to generate a binary neutral plane and a binary HLC plane;
wherein generating the neutral plane comprises:
generating a plane of achromatic data comprising the achromatic values of identified neutral pixels;
assigning non-transparent, approximately pure white value to identified color and background pixels; and
processing a resultant achromatic channel plane using a black-and-white binary image processing technique to generate the neutral plane having binary pixels; and
wherein the processor generates a two-plane binary TIFF image file by combining the binary neutral plane and the binary HLC plane, adds identifier information to each plane, and outputs the TIFF image file to an HLC device for printing.

* * * * *